M. W. GANTT.
OPTOMETROSCOPE.
APPLICATION FILED AUG. 13, 1908.
944,853.
Patented Dec. 28, 1909.
6 SHEETS—SHEET 1.
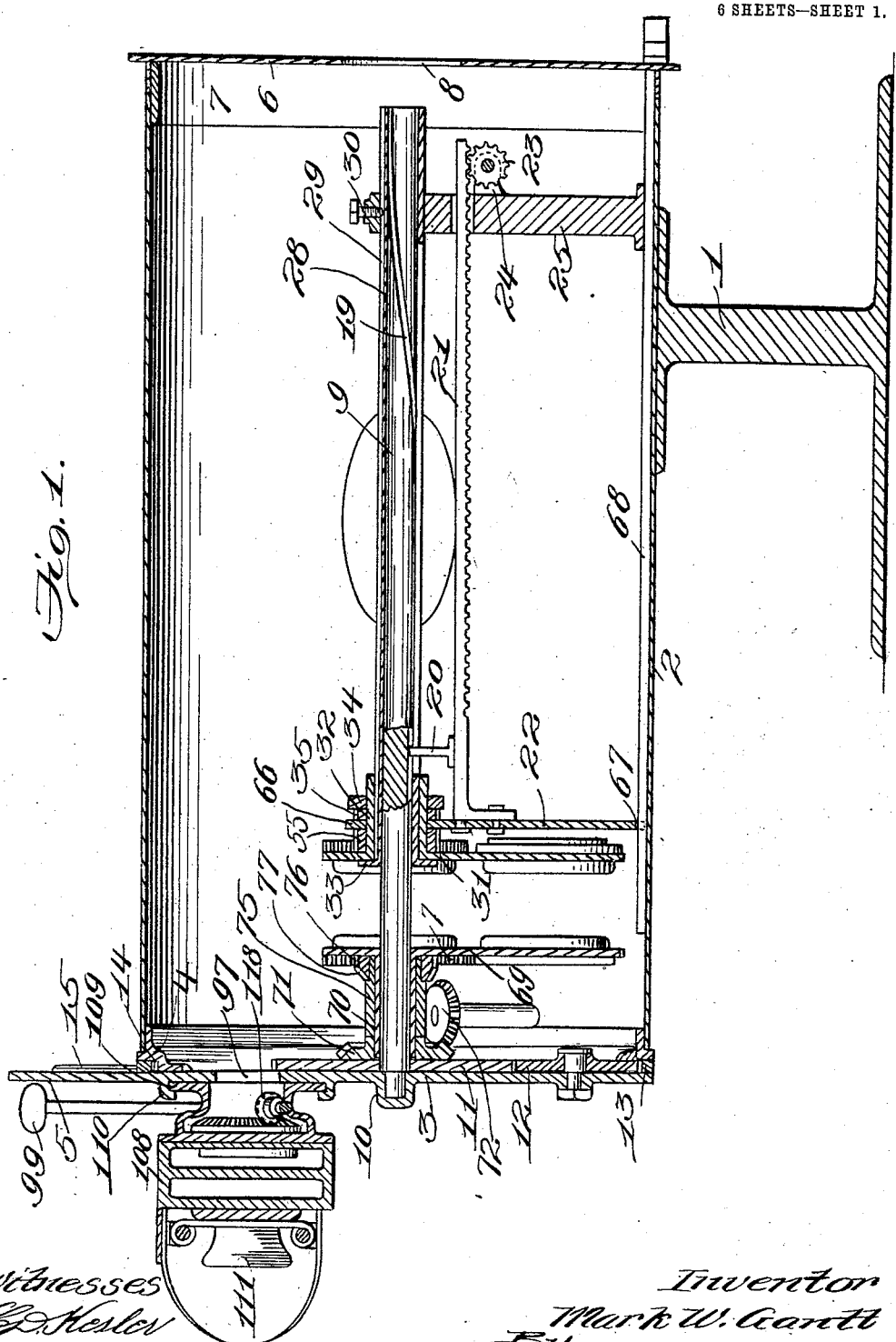
Witnesses
Inventor
Mark W. Gantt
By
James L. Norris
Atty.

M. W. GANTT.
OPTOMETROSCOPE.
APPLICATION FILED AUG. 13, 1908.
944,853.
Patented Dec. 28, 1909.
6 SHEETS—SHEET 2.
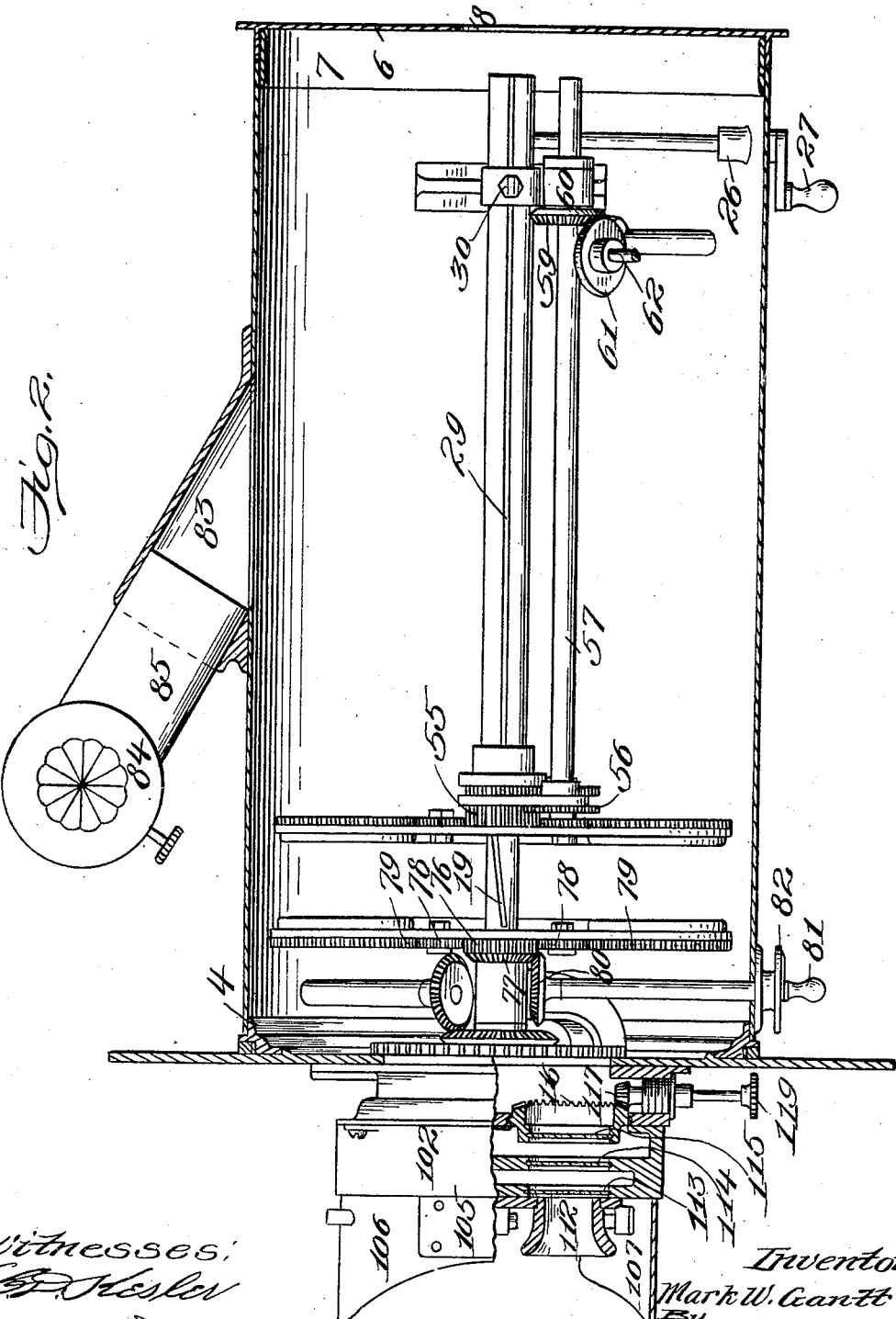

M. W. GANTT.
OPTOMETROSCOPE.
APPLICATION FILED AUG. 13, 1908.
944,853.
Patented Dec. 28, 1909.
6 SHEETS—SHEET 3.
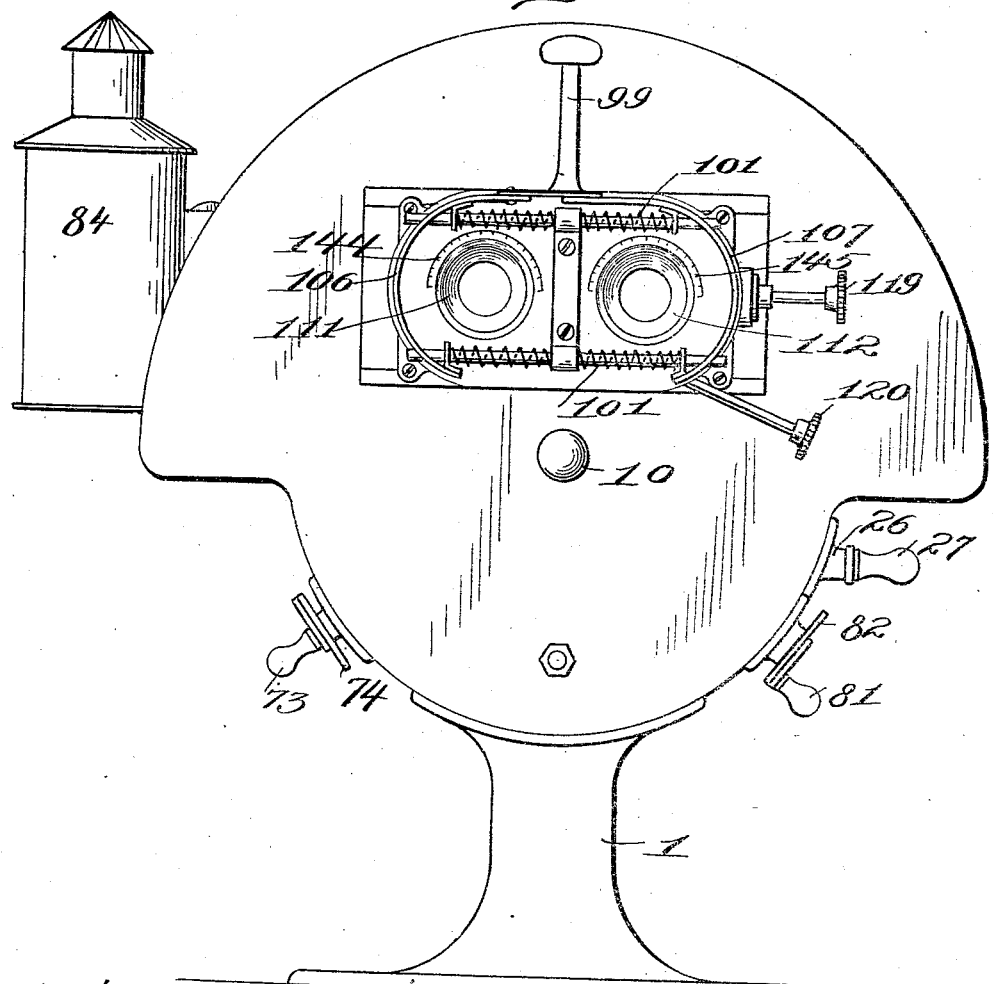
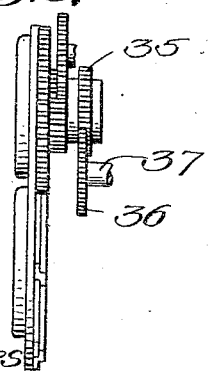
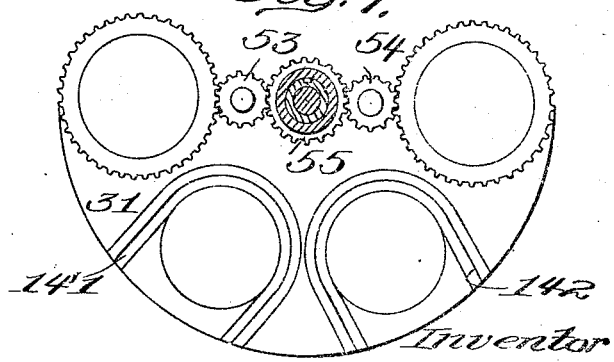

M. W. GANTT.
OPTOMETROSCOPE.
APPLICATION FILED AUG. 13, 1908.
944,853.
Patented Dec. 28, 1909.
6 SHEETS—SHEET 4.
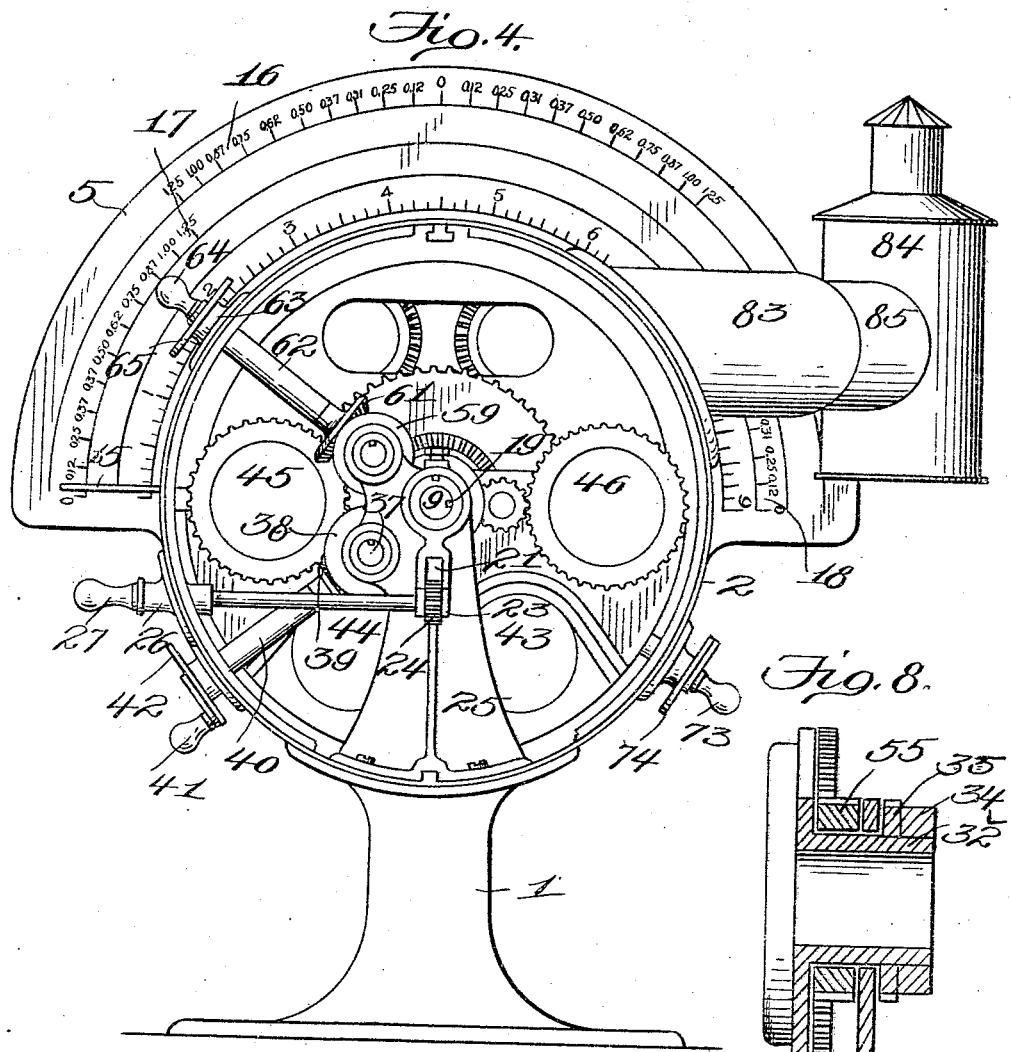
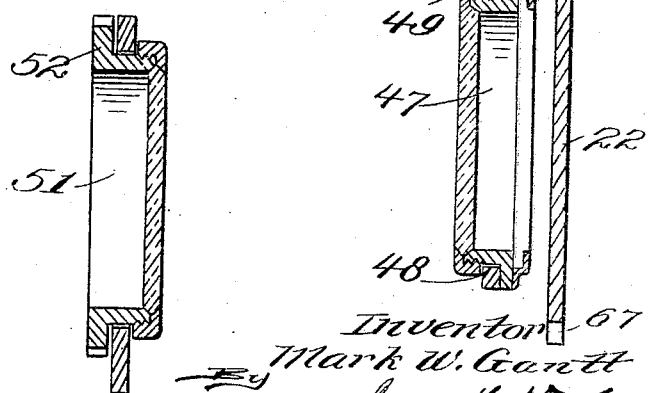

M. W. GANTT.
OPTOMETROSCOPE.
APPLICATION FILED AUG. 13, 1908.
944,853.
Patented Dec. 28, 1909.
6 SHEETS—SHEET 5.
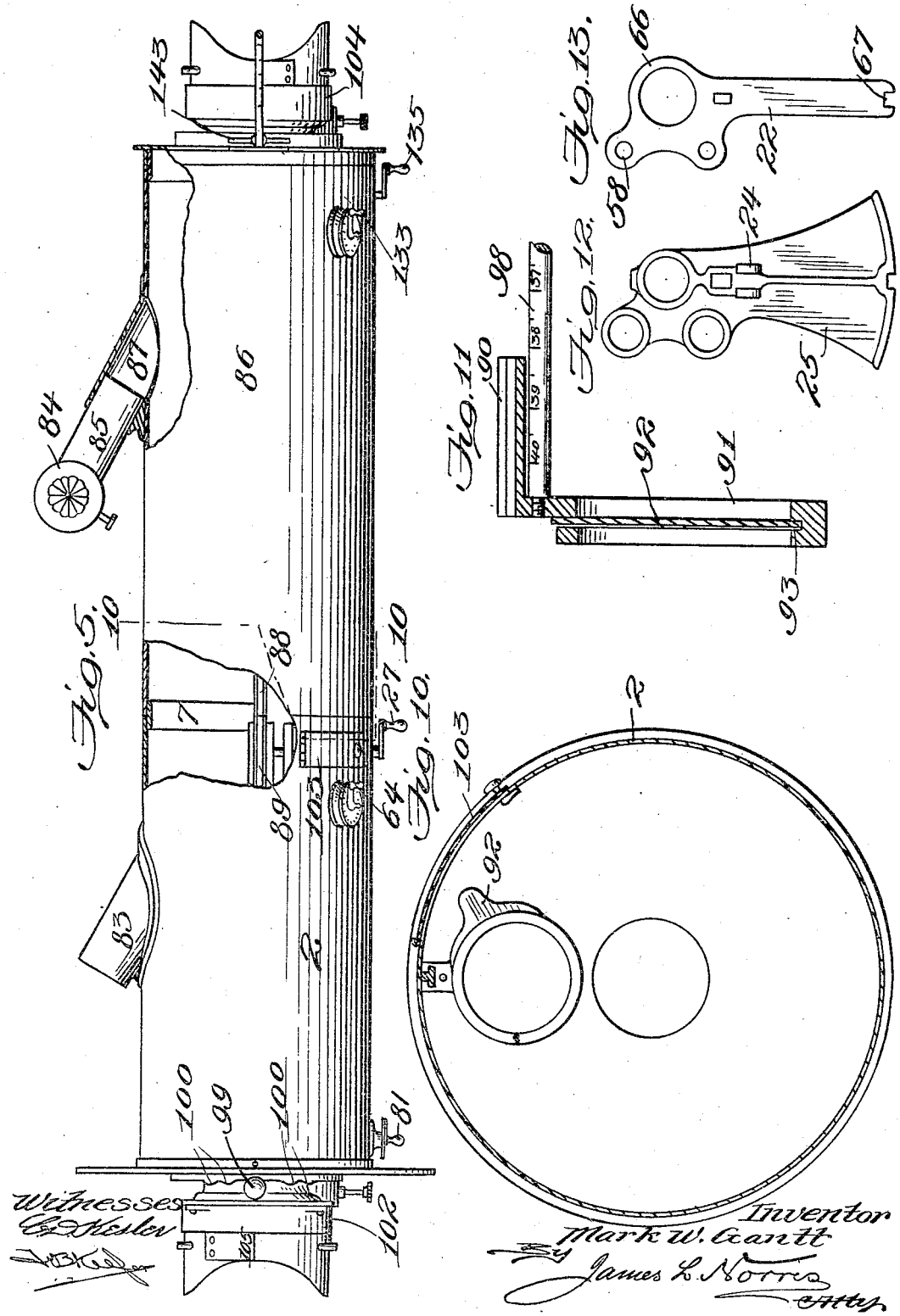
Witnesses
Inventor
Mark W. Gantt
By James L. Norris
Atty.

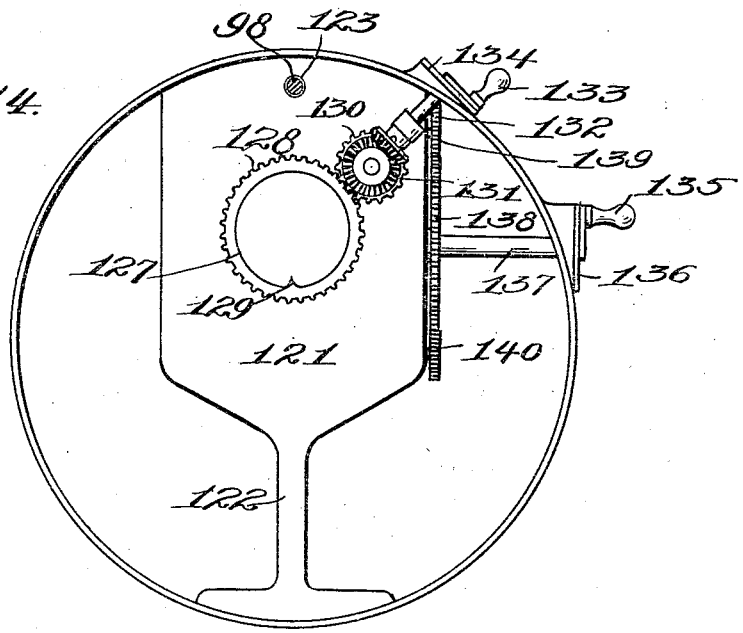
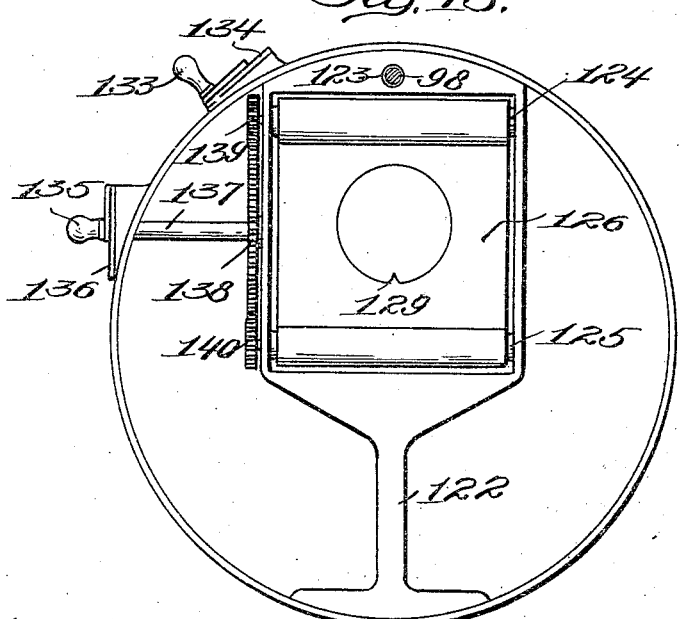

UNITED STATES PATENT OFFICE.

MARK W. GANTT, OF ATHENS, GEORGIA, ASSIGNOR OF ONE-HALF TO JOHN G. COUSAR, OF ATHENS, GEORGIA.

OPTOMETROSCOPE.

944,853.         Specification of Letters Patent.     Patented Dec. 28, 1909.

Application filed August 13, 1908. Serial No. 448,387.

*To all whom it may concern:*

Be it known that I, MARK W. GANTT, a citizen of the United States, residing at Athens, in the county of Clarke and State of Georgia, have invented new and useful Improvements in Optometroscopes, of which the following is a specification.

My present invention relates to improvements in instruments for testing the eyesight to determine the refractive conditions thereof, and it has for its object primarily to provide an improved instrument of this character wherein all the tests employed by oculists and opticians may be conducted with the greatest facility by means of the single instrument and wherein the results are indicated upon scales which may be read directly by the oculist or optician in making up the prescription for the eyeglasses, and the apparatus also facilitates examinations of the eye by the use of such instruments as the ophthalmoscope and retinoscope to determine the condition for treatment of ill-health, or causes other than refractive.

Another object of the invention is to provide an instrument of this character whereby the refractive conditions of the eye, if any, may be quickly and accurately ascertained by the relative adjustment of pairs of plus and minus lenses, which lenses when placed together neutralize one another and when separated at different distances act the same in effect as the substituting of various lenses of different known strengths before the eye under test, thereby disclosing the myopic, hypermetroid, astigmatic or other refractive conditions of the eye, an indicator being operatively connected to the movable lens for indicating directly the dioptric strength of the lens necessary to correct the refractive error of the eye.

Another object of the invention is to provide an instrument of the kind described which embodies pairs of plus and minus cylindrical lenses which are capable of being readily manipulated for the purpose of determining the astigmatic conditions of the eye, the said cylindrical lenses being capable of being separated before the eye under test so as to determine the dioptric strength, and are rotatable in order that the meridian of the astigmatism may be located, and the axes of lenses placed to correct the same.

Further objects of the invention are to provide an instrument of this character which is provided with a detachable extension or section which is adapted to form a continuation of the primary section, and both sections are provided with a track upon which a chart is slidable, said chart being adapted for use in making tests to determine the accommodation of the eyes of the patient, also to provide an instrument of this character provided with an improved hood adapted to be fitted to the face of the patient, which hood is provided with a frame adapted to receive test lenses which may be readily inserted before the eye of the patient in order to test the refractive conditions thereof after the manner of the usual trial frame, or, such lenses as may be indicated by the scales in the preceding tests may be inserted in order to verify the results of the original tests, the lens receiving frame of the hood being provided with rotatable lens holders to accommodate and properly position cylindrical lenses before the eyes of the patient, and it also provides a similar hood upon the opposite end of the instrument to receive the face of the operator when making tests with an ophthalmoscope or retinoscope, the said hood serving to cut off all light from the interior of the instrument so that the muscles of the patient's eye are relaxed, and this hood is also adapted to receive lenses to take the place of the glasses of the operator and such lenses as may be necessary to give a better view of the fundus in making examinations.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a longitudinal section of an optical instrument constructed in accordance with my present invention, the section being taken in a vertical plane; Fig. 2 also represents an axial section of the instrument shown in Fig. 1, the section being taken in a horizontal plane; Fig. 3 represents an end elevation of the instrument as viewed from the left in Figs. 1 and 2; Fig. 4 is an end elevation of the instrument as viewed from the right in Figs. 1 and 2, the cover or closure at the rear of the instrument being removed; Fig. 5 is a plan view partly in section showing the extension section fitted to the instrument; Figs. 6 to 9, inclusive, are detail views of one of the lens holders; Fig. 10 represents a transverse section of the instrument shown in Fig. 5 taken upon the line 10—10 thereof; Fig. 11 is a detail sectional view of the chart carrier which is adapted to be used in connection with the apparatus shown in Fig. 5 for making the presbyopic tests; Fig. 12 is a detail view of a supporting bracket for the shaft; Fig. 13 is a detail view of the shifting member for the movable lens holder; and Figs. 14 and 15 illustrate a stationary chart holder as viewed from the front and rear.

Similar parts are designated by the same reference characters in the several views.

In the accompanying drawing, I have shown one specific embodiment of the invention which is capable of use in performing all the ordinary tests employed by oculists and opticians in determining the refractive errors of the eye and for examining the conditions of the eye by the aid of the ophthalmoscope and retinoscope, but it will be understood that the invention is not necessarily so limited and that certain modifications in the detail construction and arrangement of the parts and that certain charts and other appliances may be used in connection with the instrument as may be found desirable or necessary.

In the present instance, the instrument comprises generally a main section which may be supported on a table or stand by means of a standard 1 which is attached to a tubular casing 2, the latter being closed at its forward end by means of a plate 3 which is fitted to the tubular casing by means of a flange 4, and the upper half of this front plate preferably projects beyond the periphery of the tubular casing to provide a segmental scale board 5 which is in approximately the form of a half circle, the rear end of the casing being substantially closed by a cover or closure 6, the latter being detachably connected to the main section by any suitable means, such for instance, as an internal flange 7, the cover being provided with an opening 8 for a purpose to be hereinafter described.

Mounted centrally within the tubular casing is a shaft 9 having its forward end journaled in a bearing 10 formed in the front plate and has a spur gear 11 fixed to rotate therewith. This spur gear is arranged to coöperate with a pinion 12 which is revolubly mounted upon the front plate, this pinion in turn coöperating with a ring gear 13 which is mounted to revolve in an annular channel 14 formed in the flange 4 and is provided with a pointer or hand 15 which projects radially from the ring and is arranged to coöperate with a set of scales 16, 17 and 18 arranged on the rear side of the scale board 5, rotation of the shaft causing a corresponding movement of the indicator with reference to the respective scales. This shaft is provided with a helical groove or key-way 19 in which a key or projection 20 operates, this key or projection being mounted upon a reciprocatory rack 21 which is attached at its forward end to the lens shifting member 22 and coöperates at its rear end with an operating pinion 23, the latter being provided with a shaft which is journaled in a pair of bearing arms 24 formed upon the shaft supporting standard 25, and the shaft of the pinion extends through a bearing 26 to the exterior of the casing and is provided with a crank 27 by means of which it may be operated, rotation of the crank causing a longitudinal movement of the rack 21, and the rectilinear movement of the key or projection 20 in traversing the helical key-way or groove 19 of the shaft will cause rotation of the latter. The shaft supporting standard 25 is secured to the bottom of the casing at a point in proximity to the rear end thereof, and a sleeve 28 surrounds the shaft 9 and is slidable longitudinally of the shaft according to the corresponding longitudinal movement of the rack 21. This sleeve, however, is not rotatable and, in order to prevent rotation thereof, it is provided with a longitudinal key-way 29 with which a set-screw or equivalent device 30 secured to the bearing standard 25 coöperates, this set-screw permitting a longitudinal movement of the sleeve through the shaft supporting standard, although preventing rotation of the sleeve.

Fitted on the forward end of the sleeve 28 is a movable lens holder 31 which is preferably a segmental disk or frame of substantially semi-circular form in order that it may be shifted into a position to bring the lenses therein into alinement with the line of vision, or, it may be wholly moved out of the line of vision. This lens holder is provided with a hub 32 which is rotatable upon the sleeve between the end flange 33 and the shoulder 34 thereon. Fixed to and rotatable with the lens holder is a gear 35 which serves to turn the lens holder either into operative or inoperative positions with respect to the line of vision, this gear coöperating with a gear 36 fixed to a shaft 37, the latter being mounted to slide longitudinally through the hub of a bevel gear 38 which is journaled in the standard 25 but is keyed to rotate with said gear, the gear 38 being arranged to coöperate with a gear 39 mounted upon a shaft 40, the said shaft extending through a bearing to the exterior of the casing and is provided with a crank 41 by means of which it may be rotated, said crank being provided with an indicator which is arranged to coöperate with a suitably graduated scale 42 surrounding the axis of the crank at the exterior of the casing. By rotating the crank 41, the shaft 37 will be correspondingly rotated irrespective of the relative longitudinal position of the movable lens holder 31, and the rotary movement of the shaft 37 will be transmitted through the gears 35 and 36 to the lens holder which will be thereby caused to turn about the central shaft 9 as an axis. This lens holder is fitted preferably with a pair of plus and minus spherical lenses 43 and 44, respectively, and also a pair of plus and minus cylinder lenses 45 and 46 and, by rotating this lens holder about the central shaft as an axis, it is possible to accurately position each lens therein in alinement with the line of vision of the patient's eye, the scale 42 being appropriately graduated so as to indicate to the operator which lens of the holder is positioned before the eye.

The spherical lenses may be fitted in the holder in any appropriate manner, such for instance, as by means of a flanged sleeve 47 which is contained in an aperture 48 in the holder and is threaded to receive a lens securing ring 49, the lens being clamped between this ring and the adjacent end of the flanged sleeve, the flange 50 of the sleeve engaging the rear side of the lens holder. The cylinder lenses, however, are rotatably mounted in the holder in order that the meridian or axis of the cylinder may be adjusted to correspond to the meridian of the astigmatic error of the eye under test, and for this purpose, the flanged sleeve 51 is rotatably fitted in the aperture in the holder and the flange 52 thereon constitutes a spur gear, the gear on the sleeve carrying each cylinder lens meshing with a pair of pinions 53 and 54 which in turn mesh with a central gear 55, the latter being revolubly mounted upon the hub 32 of the lens holder. Rotation of the central gear 55 will cause corresponding rotation of the respective cylinder lenses, and the necessary rotary movement is imparted to the gear 55 by means of a coöperating gear 56 which is fixed to a shaft 57 journaled in a bearing 58 formed on the lens shifting member 22, and this shaft 57 is slidable longitudinally through a bevel gear 59 journaled in a bearing 60 on the standard 25 but is keyed to rotate with the said bevel gear, the latter meshing with a coöperating bevel gear 61 which is mounted on a shaft 62 which shaft extends through a bearing 63 to the exterior of the casing, the outer end of the shaft being provided with an operating crank 64 and the crank in turn is provided with a dial or scale 65, the latter being graduated in degrees which indicate the angular position of the axes of each cylinder lens. The upper end of the lens shifting member 22 is provided with a ring 66 which surrounds the hub 32 of the lens frame and engages between the gears 35 and 55, the lower end of this member being provided with a notch 67 which coöperates with a longitudinally extending track 68 arranged on the bottom of the casing so as to insure a rectilinear movement of the lens shifting member as the operating rack 21 is reciprocated, a corresponding reciprocating movement being imparted to the lens shifting member which will operate to shift the movable lens holder 31 axially of the instrument.

A stationary lens holder 69 is fitted with plus and minus spherical and cylindrical lenses similar to those fitted in the movable holder above described, the lens holder 69 being provided with a hub or sleeve 70 which is loosely revoluble on the forward end of the shaft 9 and has a bevel gear 71 fixed thereto, this bevel gear coöperating with a bevel gear 72 which has an operating crank 73 which is arranged at the exterior of the instrument casing and is provided with a pointer which is arranged to coöperate with a suitably graduated dial 74, this crank 73 operating through the bevel gears 71 and 72 to rotate the lens holder 69 so as to bring the desired lens therein into the line of vision of the patient or to carry the lens holder out of the line of vision, the position of the lens holder being ascertained by reference to the dial 74. Mounted loosely upon the hub 70 is a sleeve 75 provided with a spur gear 76 and a bevel gear 77, the spur gear coöperating with a pair of pinions 78 which in turn mesh with the gears 79 formed on the revoluble frames supporting the two cylinder lenses, and a bevel gear 80 coöperates with the bevel gear 77, the bevel gear 80 being provided with a crank 81 which is arranged at the exterior of the instrument casing and is provided with an indicator or hand which is arranged to coöperate with a dial 82, the latter being graduated in degrees and serving to indicate the angular position of the axes of the two cylinder lenses. By rotating the crank 81, a corresponding rotary motion is imparted to the two cylinder lenses contained in the holder.

The necessary illumination is transmitted to the interior of the instrument casing through a socket 83 which is fitted in one side of the casing at such an angle that its axis passes through the aperture 8 in the rear closure or cover 6, a lamp or other illuminating device 84 being provided which has a tubular sleeve 85 which is adapted to detachably engage the socket as shown in Fig. 2. In testing the accommodation of the eye, an extension section 86 is detachably connected to the rear end of the main section 2, as shown in Fig. 5, the cover 6 being removed and the internal flange 7 serving to provide a secure and light-tight joint between the sections, and the cover 6 or a duplicate thereof is attached to the rear end of the extension section. This latter section is also provided with a socket 87 which is a duplicate of the socket 83, and the attaching sleeve 85 of the illuminating device is adapted to interchangeably fit either of the said sockets, the socket 87 being arranged in such angular relation to the instrument that the beam of light from the illuminating device will pass through the opening in the rear cover. This extension section is provided in the top thereof with a longitudinally extending track 88 which is arranged to register with a similar track 89 provided in the main section, and a slide 90 is shiftable longitudinally on the said track and is provided with an annular holder 91 to receive an appropriate chart 92. In the present instance, the annular holder is provided with a transverse slot 93, a door 103 being provided in the instrument casing through which the charts may be applied to the said chart holder. This chart holder is located in axial alinement with the sight aperture 97 which is formed in the front plate of the instrument above the central shaft thereof, and the distance of the chart from the eye may be adjusted by means of a rod 98 which is operable through the rear cover and is suitably graduated preferably in inches and dioptrics whereby the distance of the chart from the eye may be quickly noted by the optician.

On the front and rear of the instrument are mounted a pair of hoods 102 and 104 which are adapted to fit the faces of the patient and operator, respectively, so as to exclude light from the interior of the instrument and thereby enable the examinations to be conducted while the muscles of the patient's eye are relaxed. In order to secure this result, each hood is preferably composed of a central section 105 and a pair of slidable or otherwise adjustable outer sections 106 and 107, the latter sections being adjustable toward and from the central section in order that the hood may conform closely to the contour of the face of the patient and are normally pressed inwardly to engage the face by the springs 101, the edges of the sections being preferably fitted with felt or other relatively soft or yielding material in order to provide a light seal. Each hood is mounted upon a frame 108, the rear portion of which is provided with upper and lower flanges 109 which are slidable in horizontal guides 110 in order that the hood may occupy a position so that either eye of the patient or operator may be arranged centrally above the shaft 9, or, the two eyes of the patient or operator may be located equidistantly upon opposite sides of a perpendicular passing through the central shaft 9. A shifting handle 99 is provided for the hood 102 and is adapted to coöperate with suitable catches 100 whereby the hood may be held in either a central position, or a position at either side thereof. Within each hood are mounted a pair of eye-pieces 111 and 112 which are arranged to register with the two eyes of the patient or operator, and a set of lens holders 113, 114 and 115 are arranged in alinement with each eye-piece. The lens holders 113 and 114 are adapted to receive spherical lenses while the holder 115 is adapted to receive cylinder lenses.

In order to enable the cylinder lenses to be rotated so that the axis thereof may correspond properly with the axis of astigmatism of the eye, this holder is rotatably mounted within the frame 108 and is provided at its rear end with a bevel gear 116, the bevel gears of the respective lens holders coöperating with bevel pinions 117 and 118 which are provided respectively with the operating heads 119 and 120, both of which are preferably operable from the same side of the machine for convenience, as shown in Fig. 3.

In making certain tests, it is useful to employ a stationary chart holder 121 which is preferably mounted within the rear portion of the extension section 86 of the instrument, this holder in the present instance comprising a casing which is provided with a standard 122 which rests upon the bottom of the casing of the instrument and the upper portion of the chart holder is provided with an aperture 123 through which the adjusting rod 98 of the movable chart holder may operate. At the upper and lower portions of the stationary chart holder are revolubly mounted a pair of rolls or spools 124 and 125 upon which is wound a strip 126. This strip has printed thereon suitable objects or charts to enable various tests to be conducted therewith, this chart being adapted to be viewed through an aperture 127 which is arranged in the casing of the chart holder in alinement with the line of vision.

It is generally preferable to provide the movable strip with one or more pictures so as to enable the picture test to be performed, test type, muscular charts, color-blind charts and also astigmatic charts and, in order to locate the meridian of the astigmatism, an annular gear 128 is journaled upon the chart casing so as to surround the sight aperture therein and is provided with a pointer 129 which is revoluble about the astigmatic chart at the will of the operator. In order to facilitate the adjustment of this pointer, the same is operable from the exterior of the instrument, a gear 130 being employed in the present instance which coöperates with the annular gear 128 and is also provided with a beveled portion which coöperates with a bevel gear 131, the latter being fixed to a shaft 132 which is journaled upon the instrument casing and is provided with a crank 133 which is arranged at the exterior of the casing, a suitably graduated dial 134 being arranged also upon the exterior of the casing and is graduated in degrees with which the crank coöperates as an indicator for designating the angular position of the pointer with reference to the astigmatic chart. The different charts upon the flexible strip may also be brought into the line of vision by means of a crank 135 which is arranged at the exterior of the instrument and coöperates with a suitable dial 136 which serves to indicate which chart occupies a position in the line of vision. This crank is mounted upon a shaft 137 having a gear wheel 138 fixed thereto and which coöperates with a pair of gears 139 and 140 which are fixed to turn with the respective rolls or spools. This flexible strip of the chart holder is also preferably provided with an aperture in order to permit an unobstructed passage of light therethrough in performing certain tests.

In order to permit the presbyopic test to be conducted with facility, the movable lens holder 31 is provided at points immediately adjacent to the spherical lenses with a pair of chart-receiving holders 141 and 142 into which appropriate charts may be slipped through the door 103 in the forward section of the instrument casing, these charts occupying positions next to the respective lenses, the stationary lens holder being so adjusted that light from the rear of the instrument may be reflected directly through a clear opening therein so as to illuminate whichever chart upon the holder 21 is brought into the line of vision.

In order to permit tests by the aid of the ophthalmoscope and retinoscope, the rear hood is provided with an opening 143 into which the appropriate instrument may be inserted, the instrument occupying a position in alinement with the line of vision and in such a position as to receive a beam of light from the illuminating device when placed upon the socket 87. Over each eyepiece of the hood is also arranged a scale, the scales 144 and 145 being shown in Fig. 3 which extend to an angle of 180°, these scales serving to indicate the angular position occupied by the cylindrical lenses which are mounted in the rotatable lens holders of the hood.

An optical instrument constructed in accordance with my invention is capable of use in connection with practically all the tests which are usually employed by oculists and opticians in determining the refractive errors of the eyesight. In making the usual examination of the retina of the eye by the aid of the retinoscope, the illuminating device is applied to the socket 83 of the main section, and a retinoscope is placed in the opening 8 of the rear cover 6. The patient is placed at the left hand end of the instrument with the hood applied to the face, and the beam of light from the illuminating device is reflected by the retinoscope into the eye under test. In this manner, the fundus of the eye may be readily examined and the conditions thereof observed, the interior of the instrument being dark except for the beam of light from the illuminating device and the retinoscope. By placing the appropriate lenses in one of the holders adjacent the hood, or, by turning the forward lens holder 69 into a position to bring one of the convex lenses thereof in alinement with the eye, the retina may be magnified so as to facilitate the examination.

In order to perform the usual test by the aid of the ophthalmoscope, the rear section 86 of the instrument is removed and the rear cap carrying the hood for the operator is attached to the rear end of the casing section 2, the illuminating device being transferred from the rear socket 87 to the forward socket 83 and the ophthalmoscope being inserted in the aperture or opening 143. By placing an appropriate lens in one of the holders of the hood next to the patient's eye under examination, or by turning the forward lens holders 39 and 31 so as to bring the appropriate lenses into the line of vision, an examination of the eye may be obtained by the indirect method.

In conducting the presbyopic test, the stationary lens holder 69 only is employed, it being rotated so as to bring the plus spherical lens into the line of vision. The patient is instructed to view a chart which is placed in one of the holders of the lens holder 31, the flexible strip in the stationary chart holder being adjusted so as to bring the clear space or opening into the line of vision so that light may be reflected through the same and upon the chart in the holder 31. The lenses required to correct the refractive defect are registered on a scale in the same manner as in the dioptric test.

In order to perform the usual accommodation test, the extension section 82 is fitted to the rear end of the instrument, and an appropriate chart is placed in the slide 91. By shifting the slide while the chart is under observation by the patient, the accommodation of the eye may be quickly determined, and the reading distance may be found by reference to the scale upon the graduated rod 98 which serves to operate the slide. When the slide is at the rearmost end of the instrument, it is preferably at a distance of, say, forty inches and, by fitting the illuminating device to the rear socket 87, the chart will be properly illuminated, and the test for distant reading may then be performed. In performing this test, the test lenses may be applied to the lens holders 113, 114 and 115 in a manner similar to the use of the ordinary trial frame which, however, is commonly employed at a distance of twenty feet from the test type or reading matter, or, by removing the reflector and charts out of the line of vision, the patient is allowed to look clear through the instrument and onto a chart at a given distance and, by bringing the rotatable lens holders into service, examination is made in the same manner as in the dioptric test, only the patient views the charts the same as in the usual 20—20 test, and the registration of lenses necessary to correct the refractive errors is the same as dioptric test. Or, by dropping lenses into hood next patient's eye, all tests made with test case can be performed.

In conducting the dioptric test, the relatively stationary and movable lens holders 69 and 31 are preferably employed, these lens holders being rotated so as to bring the spherical lenses thereof into the line of vision by rotating the cranks 73 and 31, respectively. In conducting this test, both lens holders are initially placed in immediate proximity or close to one another with a plus spherical lens in one holder in alinement with a minus spherical lens in the other holder. While the patient observes the chart at the rear of the instrument, the movable lens holder 31 is shifted rearwardly by operating the crank 27 which reciprocates the rack 21. When the lens holders are in immediate proximity, the plus and minus lenses thereof neutralize one another, but as the holders are separated, the dioptric strength of the combined lenses begins to vary, and when the movable lens holder has been shifted into such a position that the dioptric strength of the two lenses corrects the refractive error of the eye so that the chart may be read properly by the patient, the appropriate scale 17 or 18 is referred to by the operator from which scale a direct reading of the dioptric strength of the lens to be employed may be determined. The pointer or indicator 15 which coöperates with these scales is rotated in proportion to the shifting movement of the movable lens holder, the shifting movement of the said holder causing rotation of the indicator by means of the key or projection 20 which operates in the helical key-way or groove 19 of the central shaft 9, the latter serving to turn the spur wheel 11 which in turn coöperates with the pinion 12 which engages the ring gear 13 upon which the pointer is mounted. One of the scales, the scale 17 in the present instance, is used when a hypermetropic condition of the eye is to be corrected, while the other scale 18 is read when a myopic condition of the eye is to be corrected, and in one case the minus spherical lens in the forward or stationary lens holder 69 is placed next to the eye while in the other case the plus lens in the said holder is to be placed next to the patient's eye, a lens of opposite curvature in each case being positioned in the line of vision by the movable holder 31. After the two holders have been separated to a point where the reading matter upon the chart may be readily read by the patient, the accommodation of the eye as to the strength of lens the eye will accept or overcome may be tested by shifting the movable lens holder, the scales 17 or 18, as previously stated, will indicate the dioptric strength of the lenses required to correct the refractive errors of the eye, and by noting these readings, the operator may make out the prescription. If so desired, the prescription may be verified by selecting the appropriate test lenses called for by the scales and inserting these test lenses in the lens holders immediately in rear of the hood, the lens holders 31 and 69 being swung out of the line of vision so that the patient may view the chart through the test lenses.

In determining the astigmatic conditions of the eye, the lens holders 31 and 69 are employed in a manner similar to that described in connection with the test for the dioptric errors, the axis of the astigmatic error having been previously determined by a viewing of the astigmatic chart by the patient, and by setting the appropriate cylindrical lenses in the holders 31 and 69 at the proper angle by turning the cranks 64 and 81, both plus and minus cylinder lenses in the two holders may be brought into a position so that their axes coincide. Then by shifting the movable lens holder 31 rearwardly while the chart is under observation by the patient, the refractive strength of the two cylinder lenses may be varied until it properly corrects the astigmatic error. The rearwardly shifting movement of the lens holder 39 will also in this instance be registered upon the appropriate scale 17 or 18, and by combining the astigmatic correction with that for the general myopic or hypermetropic condition of the eye, the proper prescription may be made out. In performing the tests, each eye may be brought into position for individual test by shifting the hood first to one side of the instrument and then to the other and, in testing the binocular vision, the hood may be placed centrally, at which point the chart or other appropriate matter may be viewed by both eyes of the patient. The hood also enables a muscular test to be performed by fitting the usual prisms into the lens holders of the hood and, if so desired, the test may be conducted solely by the aid of the hood after the manner of the usual trial frame and test case, an appropriate chart being placed in the chart holder. Also the muscular test can be conducted by the use of any of the rotary or double prisms used in trial case frames.

In conducting tests by the aid of the Maddox rod chromatic lenses, or in conducting the color-blind test, or any tests which require a blaze, the blaze is arranged at the rear end of the instrument in place of the retinoscope, and all obstacles are removed from the line of vision, this test being conducted in the same manner as with the usual trial frame and test lens.

An optical testing instrument constructed in accordance with my invention embodies all the requisite appliances for conducting the usual tests employed by oculists and opticians in determining the refractive errors of the eyesight and for examining the eye to determine the organic conditions thereof, the instrument being closed so as to render the use of the usual dark room unnecessary and, by employing such an instrument, the various tests cannot only be performed with the greatest facility, but extreme accuracy is obtainable and, moreover, as all the necessary appliances are combined in a single instrument, the expense of an outfit, and the labor of manipulating the parts thereof during the different tests are minimized, thereby enabling the operator to obtain an accurate prescription very quickly. By using a pair of relatively adjustable lens holders wherein plus and minus lenses are combined and adjusted according to the refractive power of the eye, an accurate result may be quickly obtained without losing time in applying and removing the different test lenses as commonly employed and, as the duration of the test is thus minimized, the best results are obtainable, as the entire test may be accomplished while the eye is in a normal state, that is to say, before the eye has been strained or irritated because of the fatigue of a long and trying test.

The chart holder which is adjustable at different distances also enables the usual tests for determining the accommodation, near and distant reading, astigmatism and the various defects to be conducted with the greatest facility and accuracy, the results being readable directly from the graduated rod and scale or front end and, by using a hood having lens holders fitted therein, the results obtained in the preceding tests may, if so desired, be verified by inserting the trial lenses indicated, or, the eyes may be tested solely by inserting the different trial lenses in the lens holders of the hood after the manner of the trial frame as generally employed, but obviating many of the objections attending the use of the ordinary trial frame.

I claim as my invention:—

1. An optical instrument of the class described comprising an eye-piece, and a pair of lens holders having respectively sets of plus and minus lenses therein adapted to be brought into alinement with the eye-piece, one of the lens holders being adjustable axially of the eye-piece with respect to the other holder while a plus lens in one holder is in alinement with a minus lens in the other holder whereby the refractive effect of a given pair of plus and minus lenses may be varied.

2. An optical instrument of the class described comprising an eye-piece, a pair of lens holders having sets of plus and minus lenses of different powers supported thereon and adapted to be brought into alinement with the eye-piece, the lens holders being relatively adjustable axially of the eye-piece while a plus lens in one holder is in alinement with a minus lens in the other holder, and an indicator on the exterior of the instrument for designating the refractive power of the combined lenses while adjusted at different relative distances from one another.

3. An optometroscope comprising an eye-piece, a pair of lens holders each having a pair of plus and minus lenses adapted to be brought into alinement with the eye-piece, the holders being relatively adjustable axially of the eye-piece while a plus lens in one holder is in alinement with a minus lens in the other holder for testing either the myopic or hypermetropic conditions of an eye under test, and an indicator operable during the relative axial adjustments of the lens holders for directly indicating the refractive power of the combined lenses thereof.

4. An optical instrument of the class described comprising an eye-piece, a pair of holders relatively adjustable axially of the eye-piece, a plus cylinder lens being mounted in one holder and a minus cylinder lens in the other holder, a relative axial adjustment of the holders serving to vary the refractive power of the combined cylinder lenses.

5. An optical instrument of the class described comprising a casing having an eye-piece at one end, means for supporting a chart in alinement with the eye-piece, a pair of lens holders relatively adjustable axially of the eye-piece, a plus cylinder lens rotatably mounted in one holder, a minus cylinder lens rotatably mounted in the other holder, said lenses being adapted to be brought into alinement with the eye-piece, and the relative axial adjustment of the holders while both lenses are in alinement with the eye-piece serving to vary the refractive power of the combined lenses, and means for individually rotating the respective cylinder lenses to adjust the axes thereof.

6. An optical instrument of the class described comprising a casing having an eye-piece at one end, means for supporting a chart in coöperative relation with the eye-piece, a pair of lens holders adjustable axially with respect to the eye-piece, a plus cylinder lens mounted rotatably in one holder, a minus cylinder lens rotatably mounted in the other holder, said lenses being adapted to register with one another and with the axis of the eye-piece, the relative adjustment of the holders axially of the eye-piece serving to vary the refractive power of the combined lenses, means for individually rotating the cylinder lenses of the respective holders from the exterior of the casing to adjust the axes thereof, and means for indicating the axes of the respective lenses.

7. An optical instrument of the class described comprising an eye-piece, a pair of lens holders relatively adjustable axially of the eye-piece, each having a pair of plus and minus cylinder lenses revolubly mounted therein, and means common to each pair of lenses for effecting rotation thereof to adjust their axes.

8. An optical instrument of the class described comprising a casing, an eye-piece mounted at one end thereof, means for supporting a target in said casing in coöperative relation with the eye-piece, a lens holder having a pair of plus and minus cylinder lenses revolubly mounted therein each provided with a gear, means for rotating the lens holder to set either of said lenses in optical alinement with the eye-piece, an operating gear having its axis arranged coaxially with the axis of rotation of the lens holder and having gearing connecting it with the gears of the respective cylinder lenses, means coöperating with said central operating gear for rotating the cylinder lenses in the holder, and a device for indicating the axes of the cylinder lenses.

9. An optical instrument of the class described comprising a casing having an eye-piece at one end, a lens holder mounted within the casing, a shaft for supporting said lens holder for rotary and longitudinal movements, a set of lenses mounted in said holder and adapted to be brought into optical alinement with the eye-piece by a relative rotary movement of the holder, an operating shaft connected to move longitudinally with the said holder and operatively connected to the latter for rotating it, and means operable from the exterior of the casing and connected to the operating shaft irrespective of the longitudinal position of the lens holder for effecting rotary adjustments thereof.

10. An optical instrument of the class described comprising a casing having an eye-piece arranged at one end thereof, a shaft extending longitudinally of the casing, a non-rotatable sleeve slidable longitudinally with respect to said shaft, a lens holder rotatable on said sleeve and provided with lenses adapted to be moved into optical alinement with the eye-piece, an operating rack connected to said lens holder for reciprocating it, means operable from the exterior of the casing and coöperating with said rack for actuating it, and a shaft movable longitudinally with the lens holder and provided with means for rotating the latter irrespective of its longitudinal position.

11. An optical instrument of the class described comprising a substantially closed tubular casing having an eye-piece at one end, a chart holder arranged in alinement therewith, a segmental lens holder inclosed within said tubular casing and fitted with a set of test lenses and mounted to swing into and out of optical alinement with respect to the said eye-piece, and means arranged at the exterior of the casing for indicating which lens of the set is in operative position.

12. An optical instrument of the class described comprising a suitable casing having an eye-piece therein, a lens holder adjustable axially with respect to the eye-piece, means for effecting such axial adjustment of the lens holder, and a rotatable indicator coöperative with an appropriate scale on the exterior of the casing and connected to rotate during the relative axial adjustments of the lens holder for indicating the different longitudinal positions of the latter.

13. An optical instrument of the class described comprising a suitable casing having an eye-piece therein, a longitudinal shaft mounted in the casing, a rotatable indicator connected to said shaft, a lens holder adjustable axially with respect to said shaft and having a lens holder therein adapted to be arranged in axial alinement with the eye-piece, and means operable by the lens holder to cause rotation of said shaft to turn the indicator according to the longitudinal movements of the holder.

14. An optical instrument of the class described comprising a suitable casing having an eye-piece, a shaft journaled within the casing, a lens holder movable axially with respect to said shaft and adapted to support a lens at different distances from the eye-piece, a gear rotatable with the shaft, a ring gear operatively connected to the gear of said shaft, a pointer rotatable with the ring gear, and a scale adapted to coöperate with said pointer to designate the relative distances of the lens holder from the eye-piece.

15. An optical instrument of the class described comprising a suitable casing having an eye-piece therein, a shaft journaled within the casing, a lens holder slidable longitudinally on the shaft and carrying a lens adapted to be supported at different distances from the eye-piece, means operable by the longitudinal movements of the lens holder for rotating the shaft, a gear fixed to the shaft, a ring gear surrounding the casing and carrying a pointer, a pinion connecting said ring gear to the gear upon the shaft, and a scale adapted to coöperate with said pointer.

16. An optical instrument of the class described comprising a suitable casing having an eye-piece, a shaft journaled within the casing, a sleeve surrounding and movable axially with respect to the shaft, one of said parts having a helical groove therein and the other having a key or projection to coöperate with said groove for causing relative rotation of the parts when moved longitudinally, a lens holder movable longitudinally with said sleeve and having a lens adapted to be supported at different distances from the eye-piece, and a pointer operatively connected to the shaft and rotatable according to the longitudinal movements of the lens holder.

17. An optical instrument of the class described comprising a suitable casing having an eye-piece therein, a shaft journaled within the casing and provided with a helical key-way or groove, a sleeve surrounding the shaft and movable axially thereon, the said sleeve being provided with a longitudinal key-way, a relatively fixed device arranged to coöperate with said key-way to permit longitudinal movement of the sleeve and prevent rotary movement thereof, a lens holder movable longitudinally with said sleeve and carrying a lens adapted to be supported at different distances from the eye-piece, a key or projection movable with said sleeve and adapted to coöperate with the helical key-way in the shaft to effect rotary movement of the shaft during the axial movements of the sleeve, and an indicator operable by the rotary movements of said shaft.

18. An optical instrument of the class described comprising a tubular casing having an eye-piece at one end, a holder movable longitudinally of the casing for supporting test lenses in alinement with said eye-piece, and a chart holder supported within the casing independently of said lens holder and slidable longitudinally thereof in alinement with the said eye-piece.

19. An optical instrument of the class described comprising a tubular casing having an eye-piece at one end, means for positioning sets of test lenses of different powers in alinement with the said eye-piece, a track extending longitudinally of the casing, and a chart holder guided to operate longitudinally on said track and in alinement with the eye-piece and test lenses.

20. An optical instrument of the class described comprising a tubular casing having an eye-piece at one end, a hood containing means for interchangeably supporting test lenses in alinement with the eye-piece, a chart holder supported within the casing and slidable longitudinally thereof in alinement with the eye-piece, and a scale for indicating the distance of the chart holder from the eye-piece.

21. An optical instrument of the class described comprising a tubular casing having an eye-piece at one end, means for supporting test lenses in alinement with the eye-piece, a chart holder guided to operate longitudinally within the casing in alinement with the eye-piece, and an operating rod connected to the chart holder and provided with graduations for indicating the distance of the chart from the eye-piece.

22. An optical instrument of the class described comprising a tubular casing having an eye-piece at one end, means for supporting test lenses in coöperative relation with the eye-piece, a chart holder mounted within the casing and in alinement with the eye-piece, a ring gear carrying therewith a rotatable pointer mounted on the chart holder and adapted to coöperate with a chart thereon, and an operating shaft operatively connected to the ring gear and operable from the exterior of the instrument.

23. An optical instrument of the class described comprising a main tubular section provided with an eye-piece, and means for supporting test lenses in coöperative relation therewith, an extension tubular section adapted to detachably fit the rear end of the main section, means for supporting a chart within the extension section, a pair of angularly arranged sockets formed on the main and extension sections, and an illuminating device having a sleeve adapted to interchangeably fit either of the said sockets.

24. An optical instrument of the class described comprising a tubular casing having an eye-piece at one end, means for supporting test lenses in coöperative relation therewith, a cover fitting the back of said casing and having an observation aperture therein, a chart holder mounted in the casing between the eye-piece and cover and having an aperture in alinement with the eye-piece and the observation aperture in the cover, and an illuminating device arranged at one side of the casing and adapted to project a beam of light in alinement with the observation aperture in the cover.

25. An optical instrument of the class described comprising a suitable casing, a chart holder arranged toward one end thereof, and a hood mounted at that end of the casing opposite to the chart holder and having a portion adapted to fit the face of the patient, the hood being provided with lens holders arranged one behind the other and open at the top of the hood to interchangeably receive and support test lenses.

26. An optical instrument of the class described comprising a suitable casing adapted to support a chart therein, a hood mounted on one end of the casing in operative position with respect to said chart and having eye-pieces to receive the eyes of the patient, a pair of lens holders mounted in alinement with each eye-piece, and a rotatable lens holder mounted in alinement with the lens holders first mentioned and having means operable from the exterior of the hood for rotating such rotatable lens holder to adjust the angular position thereof.

27. An optical instrument of the class described comprising a tubular casing having an eye-piece at one end, means for supporting test lenses in coöperative relation with the eye-piece, a chart holder adapted to be mounted within the casing and having a chart adapted to be arranged in the line of vision with said eye-piece, a rotatable ring gear carrying a pointer mounted on the chart holder and adapted to coöperate with an astigmatic chart thereon, and means coöperating with said ring gear for adjusting said pointer and indicating the position thereof at the exterior of the instrument casing.

28. An optical instrument of the class described comprising a tubular casing having an eye-piece at one end, means for supporting test lenses in coöperative relation with the eye-piece, a chart holder adapted to be mounted within the instrument casing, a pair of rollers mounted thereon and having a chart-carrying strip adapted to position the charts thereon in alinement with the eye-piece, and means for operating said strip from the exterior of the instrument casing.

29. An optical instrument of the class described comprising a tubular casing having a hood arranged at one end thereof and adapted to receive the face of the patient, and a hood mounted at the opposite end of the casing and adapted to receive the face of the operator, said hoods being provided with lens holders adapted to receive lenses to correct the refractive errors of the eyes of the patient and operator.

30. An optical instrument of the class described comprising a suitable casing, a hood mounted to slide transversely of the axis of the casing and having lens holders which are adapted to occupy either a central position for binocular vision or a position at either side thereof so as to bring either eye into the line of vision, and catches for retaining the hood in either of the said positions.

31. An optical instrument of the class described comprising a tubular casing, an eye-piece at one end thereof adapted to be arranged in alinement with the eye of the patient, a cap removably attached to the opposite end of the instrument and having a hood attached thereto to receive the face of the operator, a holder formed in said cap adapted to receive a retinoscope or ophthalmoscope, and means for supporting an illuminating device in coöperative relation to said holder.

In testimony whereof I have hereunto set my hand in presence of two subscribing witnesses.

MARK W. GANTT.

Witnesses:
H. C. HALL,
J. J. JENNINGS.